United States Patent [19]

Wuhrmann et al.

[11] 3,715,216

[45] Feb. 6, 1973

[54] BEVERAGE COMPOSITION

[75] Inventors: Jean-Jacques Wuhrmann, Vevey; Elvira Cristofaro, St. Saphorin, both of Switzerland

[73] Assignee: Societe d'Assistance Technique pour Prodiuts Nestle SA, Lausanne, Switzerland

[22] Filed: Aug. 17, 1970

[21] Appl. No.: 64,658

[30] Foreign Application Priority Data

Sept. 5, 1969  Switzerland..........................13483/69

[52] U.S. Cl....................................99/78, 99/DIG. 4
[51] Int. Cl...............................................A23l 1/00
[58] Field of Search......99/78, DIG. 4, 118 R, 140 R, 99/141 R, 94

[56] References Cited

UNITED STATES PATENTS

| 3,506,453 | 4/1970 | McCarron | 99/78 |
| 3,023,106 | 2/1962 | Common | 99/78 |
| 3,135,612 | 6/1964 | Hair et al. | 99/94 |
| 3,385,710 | 5/1968 | Reymond et al. | 99/78 |
| 3,551,166 | 12/1970 | Baum et al. | 99/94 |
| 2,911,300 | 11/1959 | Peebles | 99/56 |

Primary Examiner—Morris O. Wolk
Assistant Examiner—Stephen B. Davis
Attorney—Blum, Moscovitz, Friedman & Kaplan

[57] ABSTRACT

Beverage composition in the form of free flowing, granular particles comprising sugar, an edible acid and flavoring, in which the particles are agglomerated together with a binder consisting essentially of an edible fat and an edible gum. The binder composition functions as a clouding agent in the final beverage.

14 Claims, No Drawings

BEVERAGE COMPOSITION

The present invention is concerned with the production of powdered compositions adapted to be reconstituted in cold water to provide refreshing beverages of which the flavor and appearance resemble fresh juices.

There exist different products which, on dispersion in water, resemble in color and flavor the juices of fresh fruits such as orange, grapefruit, pineapple, etc. On reconstitution, these products provide beverages which however do not have the appearance, and especially the cloudiness and pulpy nature, of natural fruit juices.

In general, the substances of which these products are composed are water-soluble so that, after reconstitution with water, a relatively clear beverage is obtained which does not resemble a fruit juice, but is more in the nature of a soft drink. Attempts have been made to reproduce the natural cloudiness of fruit juices, in particular by addition to the composition of insoluble substances. After reconstitution with water, these products nevertheless tend to give unstable suspensions which either form an unattractive scum on the surface of the beverage or a sediment at the bottom of the container.

Also known are powdered compositions for preparing artificial fruit juices, such compositions containing an additive adapted to give the reconstituted beverage the opacity or turbidity found in natural fruit juices. This additive, hereafter designated "clouding agent," may for example be composed of a dry emulsion produced from a fat and an encapsulating hydrophilic colloidal material such as a water-soluble edible gum. In order to secure good dispersion of the fat particles in the reconstituted product, the clouding agent is spray-dried as a fine powder, which is then mixed with other solid constituents. After packaging of the product, the distribution of the clouding agent within the body of the beverage composition may vary after transport and handling with the result that reconstituted beverages are sometimes obtained of which the composition is not strictly the same for successive portions of product removed from the same package.

The present invention is concerned with a novel composition for preparing beverages resembling natural fruit juices, and also with a simplified process for producing the composition.

The beverage composition according to the invention is characterized in that it consists of free-flowing granular particles comprising sugar, an edible acid and a flavoring, the particles being agglomerated together with a binder consisting essentially of an edible fat and an edible gum. This composition is advantageously prepared by a process which comprises preparing a binder comprising an emulsion of an edible fat in an aqueous solution or dispersion of an edible gum, agglomerating the sugar and at least a major portion of the other solid constituents with the resulting emulsion and drying the agglomerated product.

Preferably, an aqueous solution or dispersion is prepared containing 1 to 3 parts of gum arabic and 1.5 to 6 parts of water, one part of hydrogenated edible fat is then added and the resulting emulsion is homogenized at least once.

The composition according to the invention is generally adapted for the preparation of imitation fruit juices, and especially juices resembling natural juices which are relatively cloudy in appearance, such as those obtained from the following fruits:

| | |
|---|---|
| citrus fruits | : orange<br>tangerine<br>grapefruit |
| tropical fruits | : Annona muricata L.<br>guava (Psidium guayaba)<br>mango (Mangifera indica)<br>papaya (Carica papaya)<br>passion fruit (Passiflora edulis S.) |
| drupes | : apricot<br>cherry<br>peach<br>plum |
| berries | : blackcurrant<br>raspberry<br>redcurrant | other fruits such as pear, grape, pineapple, etc.

The constitution of the composition may vary to a certain extent depending on the nature of the fruit, so that the flavor, color and texture of the reconstituted beverage resemble those of the natural juice. However, most of the ingredients are common to all compositions. This is the case for sugar, comestible acids and the clouding agent. On the other hand, the type and quantity of flavoring, coloring matter, pectin, mineral salts, vitamins, etc., are selected so that the composition of the artificial beverage corresponds as far as possible to that of the natural juice.

According to the invention, the clouding agent is preferably prepared by emulsifying an edible fat in an aqueous solution or dispersion of an edible gum. This may be carried out by directly mixing, with vigorous stirring, the three constituents of the emulsion, that is the fat, the gum and water.

However, in a preferred embodiment of the process, the clouding agent is prepared by dispersing, at a temperature between 50° and 70°C and with stirring, one part of edible fat in a solution containing 1 to 3 parts of edible gum in 1.5 to 6 parts of water. The concentration by weight of the solid matter present in the emulsion should be between 40 and 60 percent. Preferably, the edible fat is a vegetable fat: good results have been obtained with a hydrogenated peanut oil having the following properties:

| | | |
|---|---|---|
| Iodine value | : | 50 – 70 |
| Saponification value | : | 180 – 190 |
| Softening point | : | 26° – 28° C |
| Melting point | : | 28° – 30° C |

The edible gum, used as encapsulating agent, is preferably a water-soluble gum, especially gum arabic. It may also be advantageous to add a small quantity of an antioxidant to the emulsion, for example a mixture of tocopherols.

The emulsion is preferably homogenized before use, as it has been observed that the turbidity of the reconstituted beverage depends to a large extent on the conditions of homogenization, in particular the pressure. Desirably, the emulsion is subjected to two successive homogenizations, each at a pressure of about 200 kg/cm$^2$.

Separately from the emulsion, a dry blend is prepared, using appropriate apparatus, of the solid constituents of the composition, that is sugar, acid, coloring, flavoring and optional additives such as mineral salts and vitamins. Liquid flavoring and coloring materials may also be used, and these are preferably added to the emulsion prior to agglomeration.

In order to obtain a reconstituted beverage having the pulpy nature of a natural fruit juice, pectin and a stabilizing agent such as sodium carrageenate are desirably also incorporated in the composition. After careful mixing of the various constituents, the product is preferably ground to an average particle size between 0.15 and 0.20 mm, with about 80 percent of the product passing through a 210 micron mesh screen.

The product is then agglomerated to provide free-flowing granules. The emulsion used as binder is preferably dispersed on the dry blend of solid substances at a rate of 4 to 10 parts by weight of emulsion for every 100 parts of said blend. The quantity of emulsion is inversely proportional to its fat content so that for an emulsion containing 50 to 60 percent solids and having a fat/gum ratio close to 1:1, 5 to 6 parts by weight of emulsion are sufficient for 100 parts of the dry blend.

It is preferred to use a rotating disc apparatus for agglomeration. This apparatus essentially comprises a rotatable metal dish, which may be inclined with respect to the horizontal and has a peripheral rim. The dry blend is continuously deposited on the surface of the dish and the particles, on which the binder is dispersed, agglomerate together whilst moving through a certain angular distance over the surface of the dish before falling back towards the lower rim. As the operation proceeds, the agglomerates rise to the surface and overflow the rim, falling from the dish when they have reached the desired size. The dish may for example be inclined at about 28° to the horizontal, and be rotated at about 27 r.p.m. The emulsion is dispersed on the dry blend through a suitable nozzle and the resulting agglomerates or granules preferably have an average particle size between about 0.7 and 1 mm.

The agglomerates which are collected contain a certain amount of water which is eliminated by after-drying. Preferably, the product is dried as a fluidized bed in air heated at a temperature of about 70°C. The dried material may be screened prior to packaging.

Alternatively, agglomeration may be carried out in known manner in an agglomeration chamber or tower. Here, the emulsion is sprayed on a jet of powder at the top of the chamber where a temperature between 60° and 140°C is maintained and dried agglomerates or granules are collected at the base.

The flavoring used in the composition may be added at different stages of the process. If, for example, it is added to the dry agglomerated product, the volatile substances present are not exposed to the different heat treatments involved in the process and consequently evaporation losses and possible degradation of these substances is avoided. Preferably, the aroma is added to the agglomerated product in the form of a dry powder. Optionally, the aroma may be applied as a solution which is sprayed onto the agglomerates.

Alternatively, the flavoring may be added to the dry blend as a powder before agglomeration, so that the particles are distributed homogeneously throughout the mass of product by incorporation in the agglomerates. The flavoring, in liquid or solid form, may be incorporated in the emulsion of clouding agent used as binder, and homogeneous distribution of the aromatic substances throughout the dry product is thus also obtained.

The following Example, in which all parts are by weight, is given only for the purpose of illustration.

EXAMPLE 28.5 parts of powdered gum arabic are dispersed in 45 parts of water. The mixture is heated to 50°C and stirred for about 5 minutes. 25 parts of hydrogenated peanut oil having the following characteristics are then added:

| Iodine value | : | 50 – 70 |
| Saponification value | : | 180 – 190 |
| Softening point | : | 26° – 28° C |
| Melting point | : | 28° –30° C | together with 1.5 parts of a mixture of tocopherols. The mixture is emulsified at high speed for 30 seconds at a temperature of about 50°C and the resulting emulsion is then homogenized, in a conventional apparatus, in two passes each at a pressure of 200 kg/cm².

Separately, the following composition is prepared:
90.75 parts of sugar
7.26 parts of powdered citric acid
0.69 parts of pectin
0.47 parts of ascorbic acid
0.39 parts of tricalcium phosphate
0.39 parts of sodium carrageenate
0.04 parts of yellow coloring
0.01 parts of orange coloring These substances are dry blended in a suitable mixer and the product is then ground to an average particle size of 0.15 to 0.2 mm, 80 percent of the blend passing through a screen of 210 microns mesh.

The dry blend thus obtained is a agglomerated on a disc granulator of the Polysius type, the emulsion prepared as described above being used as binder which is sprayed on the product through a pneumatic nozzle at a rate of 5.7 parts per 100 parts of dry blend. The disc is inclined at 28° to the horizontal and is rotated at 27 r.p.m. The agglomerates are after-dried as a fluidized bed in air at about 70°C, and screened. A dry composition having a density between 630 and 700 g per liter and a moisture content of 0.5 percent is obtained.

The product is aromatized by addition of a concentrated orange flavoring (Tetrarome Orange 100 percent, Firmenich, Geneva) at a rate of 0.36 g per 100 g of dry granules.

In one modification, the flavoring is added to the dry blend before grinding, at a rate of 0.54 g per 100 g of blend.

Alternatively, the flavoring in liquid form is added to the emulsion of clouding agent. In this case the emulsion has the following composition:

| Gum arabic | : | 28.2 parts |
| Hydrogenated vegetable fat | : | 24.2 parts |
| Water | : | 44.5 parts |
| Tetrarome Orange 100% | : | 1.6 parts |
| Mixture of tocopherols | : | 1.5 parts |

A beverage having the appearance, texture and flavor of natural orange juice may be prepared by dispersing 150 g of dry granules in 1 liter of water at 5° -15°C and stirring for about 1 minute.

We claim:

1. A process for preparing a beverage composition which comprises agglomerating a dry blend comprising sugar and an edible acid with a binder comprising an aqueous emulsion of an edible fat and an edible gum.

2. A process according to claim 1, in which the emulsion contains 1 to 3 parts of edible gum, 1 part of edible fat and 1.5 to 6 parts of water.

3. A process according to claim 1, in which the emulsion contains 40 to 60 percent solid matter.

4. A process according to claim 1, in which the emulsion is homogenized.

5. A process according to claim 4, in which the emulsion is homogenized at a pressure of about 200 kg/cm².

6. A process according to claim 1, in which the fat is hydrogenated peanut oil having a melting point of 28°-30°C.

7. A process according to claim 1, in which the agglomeration is effected in a rotating disc granulator.

8. A process according to claim 7, in which the emulsion is at a temperature of 50° to 60°C during agglomeration.

9. A process according to claim 3, in which 4 to 10 parts of emulsion are used to agglomerate 100 parts of dry blend.

10. A process according to claim 9, in which the emulsion contains 1 to 3 parts of edible gum, 1 part of edible fat and 1.5 to 6 parts of water.

11. A process according to claim 10, in which the edible gum is gum arabic and the edible fat is hydrogenated peanut oil having a softening point of 26° to 28°C and a melting point of 28° to 30°C.

12. A process according to claim 10, in which the emulsion contains a flavoring.

13. A beverage composition in the form of free-flowing granular particles comprising sugar, an edible acid and a flavoring, the particles having been agglomerated together with a binder consisting essentially of an aqueous emulsion of an edible fat and an edible gum.

14. A composition according to claim 13, in which the size of the particles is between 0.7 and 1 mm.

* * * * *